Patented Apr. 24, 1951

2,550,622

UNITED STATES PATENT OFFICE 2,550,622

OINTMENT BASE AND IODINE OINTMENT

Abraham Taub, New York, N. Y., assignor, by mesne assignments, to Benjamin Clayton, San Marino, Calif.

No Drawing. Application July 11, 1947, Serial No. 760,516

23 Claims. (Cl. 167—63)

This invention relates to an iodine ointment, and more particularly, to such an ointment which is chemically stable and which retains substantially its initial consistency and iodine concentration for extended periods of time even in open containers under widely varying climatic conditions but which will effectively release its contained iodine when applied to the skin or to wounds.

The iodine ointment of the present invention contains elemental iodine with or without sodium iodide, preferably with sodium iodide, carried in a semi-solid ointment base which is chemically stable, which retains its semi-solid consistency throughout a temperature range from approximately $-40°$ F. to $+130°$ F., and which has the property of minimizing evaporation of iodine from the base when exposed to the atmosphere even at temperatures in the upper portion of the range just given. On the other hand the ointment, which is water-dispersible, readily liberates its contained iodine when brought into contact with the moisture of the skin or serum from wounds.

Many ointment bases are at present available to the medical and pharmaceutical professions, including petrolatum, vegetable and animal fats, water-dispersible synthetic fats, fatty alcohols and waxes, solid polyoxyethylene glycols, as well as aqueous dispersions of gums, gelatins, pectins and clays, etc. None of these prior ointment bases have, however, proven suitable for iodine ointments. All of them have one or more deficiencies. For example, certain of the known ointment bases are not compatible with iodine or sodium iodide, certain of them rapidly lose their iodine content by evaporation and certain of them do not effectively release the iodine upon application. Furthermore, ointment bases containing a predominant amount of water freeze in colder climates or change their consistency due to loss of water by evaporation. The fatty types, or those consisting predominantly of semi-solid polyoxyethylene glycols, melt in hot weather so that they lose their semi-solid consistency and become fluid. The fact is that no satisfactory stable iodine ointment has been produced prior to the present invention and iodine has continued to be sold and applied in liquid solutions such as the well known tincture of iodine. As is also well known, the constituents of such fluid preparations readily evaporate so as to change their iodine concentration.

The iodine ointment of the present invention is a smooth spreading, semi-solid gel structure in which the more important constituents are a major proportion of liquid polyhydroxy alcohol, a minor proportion of water-dispersible alkylated cellulose and a minor proportion of either elemental iodine or sodium iodide or both. Both iodine and sodium iodide are soluble to a considerable extent in the liquid polyhydroxy alcohol and the alkylated cellulose apparently forms a continuous structure of minute cells containing the liquid material since a small amount of the alkylated cellulose will convert a relatively large amount of the liquid polyhydroxy alcohol into a resulting semi-solid material which exhibits very little change in body or viscosity characteristics over an extended temperature range.

The ointment also preferably contains a minor proportion of water since a smoother ointment is thereby produced, probably by reason of a softening effect upon the alkylated cellulose. The presence of water tends to limit the amount of elemental iodine which can be retained in solution in the ointment, but this limitation is not serious since it has been found that the upper limit of iodine content in the ointment is set by other factors, such that both the optimum amount of elemental iodine and the optimum amount of water can be incorporated into the ointment. The employment of water in initially making the gel structure is also of assistance in producing a smooth spreading ointment base even if the water is partially or substantially completely removed from the final product, as later described in more detail.

The presence of a minor proportion of an oleaginous material is also desirable in the ointment. Such oleaginous material constitutes an anti-sticking agent as it prevents adherence of bandages to the skin or wound surface when an ointment in accordance with the present invention is employed with a bandage. Mineral oils, including solid oils as well as waxes, are preferred as the oleaginous material as they are, in general, less easily absorbed or washed away by wound serum. Other types of oleaginous material may, however, be employed, as later discussed in more detail, but they are not as desirable as mineral oils, for the reasons indicated above, and also because they usually absorb iodine and to some extent interfere with the liberation of the iodine when the ointment is applied.

Since the oleaginous material employed is not miscible with water, if present, or with the liquid polyhydroxy alcohol, a dispersing agent is usually employed to incorporate the oleaginous material into the ointment. Non-ionic, oil-soluble dispersing agents are preferred as they are substantially non-irritating to the skin or wound surfaces, but substantially any dispersing agent, either oil-soluble or water-soluble, which will produce a suitable emulsion or suspension of the oleaginous material in the liquid base of the ointment may be employed. That is to say, the dispersing agent may usually be employed in sufficiently small amounts that substantially no irritation occurs irrespective of the type of dispersing or emulsifying agent employed.

The preferred ointment of the present invention thus includes a major proportion of liquid polyhydroxy alcohol, and minor proportions of water-dispersible alkylated cellulose, water and mineral oil, a small amount of a dispersing agent for the mineral oil, and small amounts of both elemental iodine and sodium iodide. The iodine does not appreciably react with the other constituents of the ointment and the ointment is otherwise chemically stable. It does not rancidify or decompose upon storage. Substantially no change in viscosity or consistency of the ointment takes place within a temperature range of approximately minus 40° F. and plus 130° F. The ointment can be produced in substantially any viscosity or consistency desired from a thin paste up to a substantially solid material. Thus, heavy ointments or thin salves can be prepared, depending upon the proportions and properties of the precise ingredients employed therein. In any case, there is substantially no evaporation of the active ingredients from the ointment, even when exposed to the atmosphere at elevated temperatures within the range above given. Upon application of the ointment, however, the iodine content is liberated and rapidly penetrates into or is absorbed by the skin or other tissues. Absorption or washing away of other constituents of the ointment leaves a film of predominantly oleaginous material preventing adherence of bandages.

It is therefore an object of the invention to provide an improved iodine ointment which is chemically stable and which retains its iodine concentration even when exposed to the atmosphere under widely varying climatic conditions.

Another object of the invention is to provide an iodine ointment which can be prepared with substantially any desired consistency and which retains such consistency without substantial loss of iodine under substantially any climatic conditions likely to be encountered.

Another object of the invention is to provide a stable iodine ointment which releases its iodine content upon application to enable rapid adsorption of and effective utilization of the iodine.

Another object of the invention is to provide an improved iodine ointment in which a relatively large amount of liquid polyhydroxy alcohol is incorporated with a relatively small amount of water-dispersible alkylated cellulose and a small amount of an active ingredient containing iodine to produce a semi-solid material which retains its iodine concentration during storage but which effectively releases its iodine upon being brought into contact with moisture.

A further object of the invention is to provide an improved ointment in which an active ingredient containing iodine is incorporated into a semi-solid gel structure formed primarily from a liquid polyhydroxy alcohol and a water-dispersible alkylated cellulose and which contains a dispersed mineral oil as an anti-sticking agent.

In preparing the ointment of the present invention, the preferred method is to first produce the ointment base and then incorporate the iodine thereinto. In producing the ointment base, the preferred method is to first disperse the water-dispersible alkylated cellulose in water, the amount of water employed being substantially in excess of that desired in the final product and also substantially greater than the amount of alkylated cellulose dispersed therein. Water dispersions of various types of alkylated cellulose are available commercially and usually contain sufficient water for use in the present invention, but additional water can be added to such dispersions if desired. For best results, the ratio of water to alkylated cellulose in the initial dispersion should not be substantially less than 3 to 1 by weight and preferably is of the order of 5 to 1. Larger ratios of water to alkylated cellulose, for example, 7 to 1, may be employed although there is no advantage in employing ratios much above 5 to 1 as this requires increased evaporation of water in subsequent steps. To assist in dispersing solid alkylated cellulose in the water, temperatures as high as the boiling point of the dispersion may be employed, preferably after the alkylated cellulose has been soaked in the water at room temperature for a few minutes with occasional stirring. Heating of the dispersion, preferably at a boiling temperature, is continued until a clear liquid is obtained substantially free from entrained air bubbles and containing no white particles of unhydrolyzed alkylated cellulose.

The polyhydroxy alcohol is then added and the mixture heated to evaporate water until the water content is reduced to that desired in the final product. The most stable gel structures result when an amount of water is left in the mixture sufficient to produce a ratio of water to alkylated cellulose between approximately 0.1 to 1 and 5 to 1. The required amount of residual water for best results depends upon the nature of the polyhydroxy alcohol and alkylated cellulose employed, the higher molecular weight alcohols and the more viscous alkylated cellulose requiring more residual water. For example, for polyhydroxy alcohols having an average molecular weight of 300 or more, the minimum amount of water for best results is approximately 5% of the total base composition while for such alcohols as propylene glycol the minimum amount of water for best results is of the order of 1 to 2%. Stable ointment bases may, however, be prepared having as much as 15 to 30% water. While it is possible to prepare ointment bases containing substantially no water, they tend to have a granular structure. The amount of water in the final base composition can be employed to control the viscosity of the base. When all other factors are maintained constant, the greater the amount of water present, the lower the viscosity.

High temperatures during evaporation of water tend to discolor the resulting product. Temperatures between 100 and 160° C. may usually be employed depending upon the proportions and properties of the polyhydroxy alcohol and alkylated cellulose present. The temperature should be high enough to maintain the mixture in liquid condition and with certain mixtures, it may be necessary to use temperatures above 160° C. and with other mixtures, temperatures as low as 70° to 90° C. may be adequate, particularly if the evaporation is carried out under vacuum conditions. Upon cooling, a product having a gel structure is obtained and the formation of the gel may occur at temperatures ranging between 60° and 120° C. depending upon the properties and proportions of the ingredients employed. It is preferred, however, to incorporate an oleaginous material such as mineral oil containing an oil-soluble dispersing agent into the gel forming mixture prior to cooling as described below.

A gel forming mixture can be prepared in the absence of water although, as pointed out above, the resulting base tends to have a somewhat granular rather than a smooth consistency. To prepare such a substantially water free material, a minor portion of a water-dispersible alkylated cellulose is added to a major portion of a polyhydroxy alcohol and the mixture heated to a moderately elevated temperature with constant stirring until a clear liquid free from bubbles or froth is obtained. In general, the temperature required to produce such clear liquid will vary between 100° and 160° C. although in most cases temperatures between 120° and 130° C. are preferred. It is preferred to carry out this portion of the process at the lowest temperature which produces the clear liquid referred to, since higher temperatures tend to discolor the products. Even higher temperatures than 160° C. can be employed, however, with certain mixtures of alkylated cellulose and polyhydroxy alcohols, if this is necessary. Upon cooling, a gel structure is formed and the formation of the gel may occur at temperatures ranging from 60° to 120° C., depending upon the properties and proportions of the ingredients employed.

A somewhat improved gel structure is obtained if instead of using substantially water-free materials, an amount of water equivalent to the residual water left in the final product by the preferred method first described is added to the mixture of alkylated cellulose and polyhydroxy alcohol prior to heating in the procedure of the above paragraph. This produces a smoother consistency in the final base but, as stated above, the best products are produced by first dispersing the alkylated cellulose in an excess of water followed by evaporation of water after the polyhydroxy alcohol has been added.

Any other ingredients including the oleoginous material, if employed, and the dispersing agent therefor are preferably added to any of the materials prepared as described above before substantial gel formation takes place. A preferred operation is to cool the material to a temperature of approximately 100° to 105° C. or if this temperature is below that of gel formation, to a temperature slightly above the beginning of gelation, for example, to 1° to 10° C. above this temperature, and then add the oleaginous material and dispersing agent mixture thereto after which continued cooling results in the final product. If the gel forming mixture contains entrained air bubbles, the mixture may be held at said temperature slightly above the beginning of gelation for a substantial period of time, for example, 1 or 2 hours or even longer, before adding the oleaginous material in order to allow any entrained air bubbles to escape.

A mineral oil is, in most cases, the preferred oleaginous material and a mineral oil, dispersing agent mixture is preferably prepared by moderately heating the mineral oil, for example, to a temperature of 90° to 105° C. An oil-soluble dispersing agent is then slowly added to the mineral oil with constant stirring and this stirring is continued until any froth or foam has subsided. The temperature of this mixture is then adjusted to approximately that of the gel forming mixture, i. e., a temperature slightly above gelation of the latter mixture. In some cases, it may be necessary to increase the temperature of the gel forming mixture in order to avoid cooling of the mineral oil mixture to an extent causing solidification during mixing, but such heating is to be avoided if possible. The two liquids are then mixed under slow agitation for a few minutes until a homogeneous translucent or nearly transparent liquid or soft gel is obtained. The preferred procedure is to add the mineral oil mixture to the gel forming mixture. The resulting material is cooled or allowed to cool to room temperature, during which cooling congelation takes place. After cooling the product is then preferably remixed with any suitable type of moderate agitation and may then be placed in any suitable containers, for example, by extrusion through a nozzle. Since it is difficult to prevent evaporation of iodine at elevated temperatures, the active ingredient, namely iodine or iodine and sodium iodide, is preferably incorporated into the ointment during the remixing operation referred to although the ointment base may be stored either before or after such remixing and the iodine containing ingredient later admixed therewith.

Water-dispersible alkylated cellulose compounds are obtainable in various viscosities and the amount of such material employed in the composition will vary over a considerable range depending upon the viscosity and consistency of the ointment base desired and the viscosity of the particular alkylated cellulose selected. The preferred alkylated cellulose is hydroxyethyl cellulose as this maerial can be obtained in a form which is dispersible in hot or cold water and forms a stable gel structure with polyhydroxy alcohols even when employed in relatively small proportions. For example, for extremely soft ointments, the amount of hydroxyethyl cellulose may be as little as ½% by weight of the polyhydroxy alcohol while for heavier ointments up to as much as 20 to 25% may be employed depending upon the particular polyhydroxy alcohol selected. Another effective alkylated cellulose is methyl cellulose. Methyl cellulose may also be obtained in a form which is completely water-dispersible and produces a gel structure with polyhydroxy alcohols. This material can be employed in substantially the same range as the hydroxyethyl cellulose, but in general, tends to produce a more granular type of gel. The glycollic acid ethers of cellulose and their metallic salts, such as the sodium and aluminum salts, may also be employed. On the basis of the weight of the entire ointment base, the amount of alkylated cellulose will range between approximately .3 and 15% of the compositions.

The preferred polyhydroxy alcohols, i. e., those producing the most stable gels, are of the polyoxyethylene glycol type, known also as polyethylene glycols, having the general formula

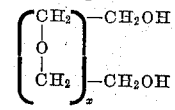

where $x$ is a small whole number, the term "polyhydroxy alcohols" being understood to be inclusive of the polyhydroxy ether alcohols. An example of such a glycol which is particularly suitable for the present invention is triethylene glycol having a molecular weight of approximately 150 and for which the $x$ of the above formula is 2. Commercial mixtures of liquid polyoxyethylene glycols are available on the market and are sold on a basis of the average molecular weight. Thus mixtures having average molecular weights of 200, 300 and 400 are commercially available products, and are usable in the present invention. The individual polyoxyethylene glycols of greater molecular weight than triethylene glycol, for example, hexaethylene glycol and nonaethylene glycol having an $x$ in the above formula of 5 and 8, respectively, and a molecular weight of approximately 282 and 415, respectively, are also suitable for use in the present invention. In fact, such glycols or mixtures thereof having average molecular weights up to approximately 900 can be employed, those having molecular weights much above 900 not being usable as they are solid or semi-solid at room temperatures.

Polyhydroxy alcohols other than those of the polyoxyethylene glycol type above described may also be employed, for example, propylene glycol, ethylene glycol, glycerine, etc. Propylene glycol produces an effective gel structure and is particularly suitable for admixture with polyoxyethylene glycols of higher molecular weight to secure a desired viscosity or consistency of the final product. The same is true of ethylene glycol, this material tending to form a soft gel when employed as the only polyhydroxy alcohol and reducing the viscosity of the final product when employed in admixture with polyoxyethylene glycols. Mixtures of ethylene glycol and propylene glycol may also be employed in the same manner either as the polyhydroxy alcohol of the ointment base or in admixture with polyoxyethylene glycols or other polyhydroxy alcohols. The viscosity of the alkylated cellulose as well as the relative proportions of this material and the other ingredients including the polyhydroxy alcohol also have an effect upon whether a soft or stiff gel is produced. For example, increasing the ratio of alkylated cellulose relative to polyhydroxy alcohol tends to produce a stiffer gel which in turn tends to produce a more viscous final ointment. The amount of water in the alkylated cellulose-polyhydroxy alcohol mixture as well as the viscosity of the mineral oil or other oleaginous material employed also affects the viscosity of the final ointment, water tending to reduce the viscosity. Varying certain or all of these factors enables a final ointment of a predetermined desired viscosity to be produced utilizing any of the liquid polyhydroxy alcohols although certain polyhydroxy alcohols in mixtures containing water give the most stable gels as discussed above. The amounts of the polyhydroxy alcohol employed to form the ointment base will vary between approximately 50 to 90% of the final ointment. Thus, the polyhydroxy alcohol is the major ingredient of the ointment base.

While a mineral oil is the preferred oleaginous material, substantially any fatty or fat-like material which is insoluble in the polyhydroxy alcohol or water may be employed. Thus vegetable and animal oils, fats, waxes as well as fatty acids and various synthetic esters, ethers and alcohols of fatty acids may be employed. In general, oleaginous materials other than mineral oils are not as desirable as mineral oils as they tend to rancidify, are more readily absorbed with the polyhydroxy alcohol, and are not as effective in preventing adhesion of gauze or other bandages. Also, they are more likely to absorb the iodine and prevent its effective release when the ointment is applied. They may, however, be successfully employed, particularly if the proportion of the active ingredient is increased over that when mineral oils are employed as the oleaginous material. The oleaginous material may, in general, vary from thin oily materials up to solid materials. Thus, mineral oils, such as deodorized kerosene, light and heavy oils in the lubricating range, petrolatums, solid paraffins, earth waxes and other paraffinic or naphthenic hydrocarbons, as well as various mixtures thereof or mixtures with other oleaginous materials may be employed. In general, the higher the viscosity of the oleaginous materials or mixtures thereof, the smaller the amount employed. The amount and nature of the oleaginous material incorporated into the ointment base will, to some extent, vary the viscosity or stiffness of the final ointment and may be selected to produce a desired consistency. In general, the amount of oleaginous material employed will range between 3 and 20% of the base.

The dispersing agent is employed in relatively small amounts and, in general, this amount will be between approximately 0.01 to 10% of the weight of the oleaginous material, i. e., from approximately 0.0005 to 2% of the entire ointment base. The preferred dispersing agent is an oil-soluble phospholipid, vegetable phosphatides being most advantageous. When mineral oil is the oleaginous material, the phosphatides are desirably free from vegetable oils. Corn oil phosphatides are preferred since they are light in color, extremely stable and are effective dispersing agents for oleaginous materials in general. Other vegetable oil phosphatides such as cottonseed phosphatides and soya bean phosphatides may, however, be employed. Oil-free corn oil phosphatides are commercially available and also corn oil and soya bean phosphatides containing carrier oil are commercially available. These latter materials may be freed of their carrier oil content by extraction with acetone or lower aliphatic alcohols. When alcohols are employed, the lecithins are also largely removed with the carrier oil, leaving the cephalins. The cephalins alone are effective dispersing agents and the same is true of the lecithins which can be recovered from the alcohol solution in any suitable manner, for example, by precipitation with acetone. Also, various phosphatidic compounds, such as those disclosed in the patent to Morris Mattikow No. 2,271,127 and the patents to Benjamin H. Thurman Nos. 2,271,409 and 2,271,410, all granted January 27, 1942, may be employed and the same is true of synthetic phosphatides such as synthetic cephalins and lecithins as well as synthetic compounds of glycerine, fatty acids and phosphoric acid which are commercially available as substitutes for commercial lecithins in chocolates. All of these materials are phospholipids and constitute non-ionic oil-soluble dispersing agents.

Instead of phospholipids, other non-ionic, oil-soluble dispersing agents may be employed. Such agents include various alcohols, esters and ethers, for example, cholesterol, cholesteryl esters, glyceryl monostearate, sorbitol, monolaurate, nonaethylene glycol monostearate, condensed glycol esters, diethylene glycol monolaurate, sorbitan mono-oleate, etc. The non-ionic, oil-soluble dispersing agents, including the phospholipids discussed above are, in general, substantially non-irritating, the oil-free corn oil phosphatides being the most effective non-irritating, dispersing agents.

While the non-ionic, oil-soluble dispersing agents are preferred because of their non-irritating character, nearly any type of dispersing or surface active compound can be employed in the small amounts necessary. Thus, anionic dispersing agents includng alkali metal soaps; organic sulfates such as the sodium salt of aluryl sulfuric acid; sulfated esters such as the sodium salt of sulfated mono-glyceride lauryl ester; sulfated amides; sulfonates such as alkyl sulfonates, alkyl-aryl sulfonates, sulfonated esters and sulfonated amides, etc., can be employed. Also, cationic dispersing agents such as substituted quaternary ammonium salts, for example, lauryl diethyl benzyl ammonium chloride or dodecoxymethyl pyridinium chloride may be employed. In using dispersing agents an amount of iodine sufficient to be absorbed by any unsaturated linkages should be present in excess of the desired final concentration of free or elemental iodine.

The viscosity of the final product will, of course, depend upon the viscosity of the alkylated cellulose employed, the molecular weight and other properties of the polyhydroxy alcohol, and the viscosity of the oleaginous material, if employed, as well as the relative proportions of these materials and the amount of water present in the final product. As stated above, the most stable gel structures are produced when water is present in the final product as a result of first dispersing the alkylated cellulose in an excess of water and evaporating water after the addition of the polyhydroxy alcohol. For best results, this amount of water may range from approximately 1 to 30% of the total base composition, the smaller amounts being desirable when polyhydroxy alcohols of low molecular weight, such as diethylene glycol or propylene glycol, constitute the major portion of the polyhydroxy alcohol or the alkylated cellulose is of relatively low viscosity. Larger amounts of water are desirable, such as a minimum of 5%, when polyoxyethylene glycols of high molecular weight are employed, or the alkylated cellulose is of relatively high viscosity. Any of the final ointment bases of the present invention are compatible with water and water may be admixed therewith after the base has been formed until the total water in the composition is as high as approximately 25 to 30%. Thus, sodium iodide or equivalent iodine salt may be incorporated in an aqueous solution, if desired, so long as the total amount of water in the composition does not exceed the above limits.

As stated above, the preferred method of incorporating iodine is to admix both elemental iodine and sodium iodide with the cooled ointment base. Both of these materials have substantial solubility in the polyhydroxy alcohol of the gel. So far as compatibility with the ointment base is concerned, the amounts of either or both elemental iodine and sodium iodide may vary through relatively wide limits. Thus, iodine is soluble in triethylene glycol up to approximately 20% of the glycol and sodium iodide has considerably higher solubility therein. The solubilities in other liquid polyhydroxy alcohols are very similar. Sodium iodide is quite soluble in water but iodine is soluble in water only to about 0.03%. Thus, in low water content ointment bases, as much as approximately 15% iodine can be incorporated along with an even greater amount of sodium iodide. With ointment bases containing substantial amounts of water, for example, 20 to 25% water, the iodine content may be as high as approximately 5 to 10%. The solubility of sodium iodide is increased by addition of water.

The amount of iodine desirably present in the ointment is, however, determined largely by the intended use of the ointment and does not exceed the amount which is soluble in the ointment bases of the present invention. Thus, the preferred amount of iodine for general use is 2% of the total amount of the base and the preferred amount of sodium iodide is 2.4% of the total amount of the base. In the absence of sodium iodide, if the amount of elemental iodine exceeds approximately 2%, iodine crystals form when the ointment is brought into contact with a substantial amount of aqueous fluids, for example, with serum from a wound and this is undesirable for most purposes. Also, the sodium iodide content should not be too great, and 2.4% sodium iodide in conjunction with 2% iodine appears to provide the most desirable concentrations for most purposes. The property of the present ointment, of readily releasing iodine, however, makes it possible to employ lesser amounts of both iodine and sodium iodide. Thus, amounts of these materials as small as 1% or even ½% are effective for certain purposes. On the other hand, larger amounts of iodine or iodine and sodium iodide are sometimes desirable, for example, 4 to 5% or even 10% iodine and amounts of sodium iodide ranging as high as 15%. It is usually desirable to incorporate both iodine and sodium iodide as the sodium iodide increases the activity of the iodine, although for certain uses, elemental iodine may be used alone. While sodium iodide is the soluble salt of iodine which is usually employed in pharmaceutical preparations, it is apparent that other soluble iodine salts may be substituted therefor for certain purposes, for example, other alkali metal salts of iodine.

As specific examples of ointment bases suitable for the incorporation of iodine or iodine with sodium iodide to form an iodine ointment the following are given:

*Example 1*

A gel forming mixture was prepared by adding 5 parts of a commercial grade of hydroxyethyl cellulose, a 5% solution in water at 20° C. having a viscosity of 15 centipoises, to 25 parts of water at room temperature. The hydroxyethyl cellulose was soaked in the water with occasional stirring for approximately 15 minutes after which the mixture was boiled until most of the small entrapped air bubbles were eliminated and the hydroxyethyl cellulose was completely dispersed as shown by the absence of white particles of unhydrolyzed hydroxyethyl cellulose. In a particular case this required approximately 15 minutes boiling time but this time may vary between approximately 5 and 30 minutes. Triethylene glycol was then added in an amount equal to 35 parts and the mixture heated to a temperature between 100° and 105° C. to evaporate water, heating being continued until approximately 10 parts of water remained in the mixture. The resulting mixture contained approximately 10% hydroxyethyl cellulose, 70% triethylene glycol and 20% water. Upon cooling a gel of ointment consistency formed suitable for an ointment base. Also, an oleaginous material and a suitable dispersing agent can be incorporated in the above base to form a non-adherent ointment base as indicated in examples below.

*Example 2*

The same procedure was employed as in Example 1 except that 25 parts of a commercial mixture of polyoxyethylene glycols having an average molecular weight of 400 were employed and final evaporation of water was discontinued when 15 parts of water remained in the mixture. This polyoxyethylene glycol contained substantial proportions of such glycols ranging from tetraethylene glycol having a molecular weight of approximately 194 to pentadecaethylene glycol having a molecular weight of approximately 679 with relatively large proportions of compounds ranging from heptaethylene glycol having a molecular weight of approximately 326 to dodecaethylene glycol having a molecular weight of approximately 547. The resulting composition contained approximately 11.1% hydroxyethyl cellulose, 55.5% polyoxyethylene glycol and 33.4% water. Upon cooling a gel of ointment base consistency formed. Also an oleaginous material and dispersing agent may be incorporated as indicated in examples below.

Example 3

A gel-forming mixture was prepared in the absence of water by gradually adding 1 part of hydroxyethyl cellulose having a viscosity of 15 centipoises to 15 parts of propylene glycol during stirring of the latter and the resulting mixture rapidly heated to approximately 130° C. with continued stirring but without violent agitation. A clear liquid free from foam was obtained. This liquid had a gelation point slightly below 100° C. and was cooled to 100° C. and allowed to stand for approximately one hour to enable any residual air bubbles to be expelled. The resulting composition contained approximately 6.2% hydroxyethyl cellulose and 93.8% propylene glycol and formed a gel of ointment consistency upon cooling. An oleaginous material and dispersing agent may be incorporated as indicated in examples below.

Example 4

As an example in which water is incorporated in a somewhat less effective manner, 4 parts of the hydroxyethyl cellulose were added to 40 parts propylene glycol containing 4 parts of water and the gel-forming mixture prepared under the same conditions described in Example 3. The resulting composition contained approximately 8.3% hydroxyethyl cellulose, 83.4% propylene glycol and 8.3% water. Upon cooling, a gel of ointment consistency formed. This composition is also suitable for the incorporation of an oleaginous material and dispersing agent as indicated in examples below.

Example 5

As an example of a gel-forming mixture which is preferred for most ointment bases, 52 parts of a 10% aqueous solution of a low viscosity hydroxyethyl cellulose (a 5% aqueous solution having a viscosity of 20.2 centipoises at 20° C.) was heated to approximately 230° F. under a vacuum of approximately 25 inches of mercury until 17.4 parts of water were evaporated leaving a solution containing 5.2 parts hydroxyethyl cellulose and 29.4 parts water. To the resulting solution, 31.5 parts of triethylene glycol was added and evaporation under vacuum conditions continued until an additional 18.9 parts of water were evaporated. The resulting composition contained approximately 11% hydroxyethyl cellulose, 66.7% triethylene glycol and 22.3% water. A gel of ointment consistency resulted when this composition was cooled.

Example 6

An oleaginous material containing a dispersing agent and suitable for incorporating into any of the compositions of Examples 1 to 5 for making an ointment base was prepared by heating 3 parts of a white mineral oil having a viscosity of approximately 50 Saybolt seconds to approximately 100° C. and approximately $\frac{1}{10}$ part of oil-free corn oil phosphatide gradually added thereto while the mineral oil was being constantly stirred. The oil-free corn oil phosphatide was in powdered form and was sprinkled into the mineral oil during such stirring. Considerable foam formation took place and the stirring was continued until this foam had subsided.

Example 7

As another example of an oleaginous material containing a dispersing agent and suitable for incorporation into the compositions of Examples 1 to 5, a mixture of 4 parts of white petrolatum, i. e., petroleum jelly of the type sold under the trade name "Vaseline," and $\frac{1}{10}$ part oil-free corn oil phosphatide was prepared by heating the petrolatum to approximately 105° C. and gradually adding the phosphatide as described with respect to Example 6.

Example 8

As an example of an oleaginous material which is preferred for most ointment bases, particularly when employed in conjunction with the gel-forming composition of Example 5, 26 parts of mineral oil as specified in the U. S. Pharmacopeia were heated to approximately 100° C. and 2 parts of oil-free corn oil phosphatide gradually added with constant stirring until the mixture was substantially free from foam.

Example 9

To produce an ointment base containing an oleaginous material, 50 parts of the composition of Example 1 was admixed with 9 parts of the composition of Example 6. The mineral oil-phosphatide composition of Example 6, while at a temperature of 100° C., was gradually added with slow agitation to the triethylene glycol-hydroxyethyl cellulose-water composition of Example 1, which was also at a temperature of approximately 100° C. After about five minutes a homogeneous, nearly transparent, liquid was obtained. Stirring was discontinued and the mixture was allowed to cool to room temperature. A material having a gel structure was obtained. Upon stirring, a final material having a consistency suitable for an ointment base and suitable for incorporation of active ingredients such as medicaments was obtained. The proportions of the various materials in this ointment base were approximately 8.5% hydroxyethyl cellulose, 59.3% triethylene glycol, 17.0% water, 14.7% mineral oil and 0.5% phosphatides.

Example 10

As another example of an ointment base, 6 parts of the composition of Example 2 containing polyoxyethylene glycol of relatively high molecular weight was combined with 1 part of the petrolatum-phosphatide composition of Example 7 in the manner described in Example 9. Upon cooling, a highly stable ointment base having a gel structure was produced. This ointment base contained approximately 9.5% hydroxyethyl cellulose, 47.9% polyoxyethylene glycols, 28.3% water, 13.3% petrolatum and 0.4% corn oil phosphatides.

Example 11

An ointment base having a gel structure was prepared by admixing 16 parts of the hydroxyethyl cellulose-propylene glycol composition of Example 3 with 3.1 parts of the mineral oil-phosphatide composition of Example 6. The latter composition was gradually added to the former with slow agitation while both were at a temperature of approximately 100° C. After about 5 minutes, a homogeneous, nearly transparent, liquid was obtained which upon cooling to room temperature produced an ointment base having a gel structure. The proportion of materials in the final material was approximately 5.2 hydroxyethyl cellulose, 78.6% propylene glycol, 15.7% mineral oil and 0.5% oil-free corn oil phosphatide.

Example 12

As another example of an ointment base, 44 parts of the composition of Example 4 containing hydroxyethyl cellulose, propylene glycol and water was admixed with 4.1 parts of the composition of Example 7 containing petrolatum and corn oil phosphatides. The composition containing the petrolatum was stirred into the composition containing the propylene glycol while both were at a temperature of approximately 105° C. and the resulting product cooled to room temperature. During cooling the product formed a gel structure containing the mineral oil. The proportions of the various materials in the final product were approximately, propylene glycol 76.7%, hydroxyethyl cellulose 7.7%, mineral oil 7.7, water 7.7% and oil-free corn oil phosphatide 0.2%.

Example 13

As an example of an ointment base which is preferred for most purposes, 2.8 parts of the composition of Example 8 at a temperature of approximately 100° C. were gradually added to 47.2 parts of the composition of Example 5 at the same temperature with slow agitation. When a substantially clear liquid was obtained the resulting composition was cooled to room temperature to produce a base of ointment consistency. The proportions of the various ingredients in this ointment base were approximately 10.4% hydroxyethyl cellulose, 63% triethylene glycol, 21% water, 5.2% mineral oil, and 0.4% phosphatides.

From the above examples, it will be apparent that any of the compositions of Examples 1 to 5, inclusive, with or without the presence of an oleaginous material in the composition, are suitable bases for iodine ointments. The compositions of any of Examples 6 to 8, inclusive, may be incorporated into any of the compositions of Examples 1 to 5 to produce bases containing oleaginous materials, as indicated by Examples 9 to 13, inclusive, which are suitable for iodine ointment bases. All of these bases are compatible with iodine or sodium iodide, exhibit very little change in consistency over a temperature range between approximately −40° F. to +130° F., retain substantially their original iodine concentration even when exposed to the atmosphere through the temperature range above given but readily release iodine when applied.

In the above examples, various oleaginous materials including other mineral oils or waxes as well as glyceride oils and fats, vegetable and animal waxes, fatty acids, fatty alcohols, esters, ethers, etc., as well as various mixtures of oleaginous materials can be substituted for the mineral oils or waxes specified in substantially the same proportions to prevent adherence of bandages. Also, other dispersing agents, either oil-soluble or water-soluble, including anionic and cationic dispersing agents as well as other non-ionic dispersing agents and various mixtures of dispersing agents may be substituted for the preferred phospholipids such as phosphatides to produce useful ointment bases.

Example 14

As a specific example of an ointment base containing an ionic dispersing agent and vegetable oil as an oleaginous material, .05 part of sodium lauryl sulfate are admixed with 47.2 parts of the composition of Example 5 and while the resulting mixture is at a temperature of approximately 100° C., 2.75 parts of melted hydrogenated corn oil of shortening consistency and at a temperature of approximately 100° C. is gradually added thereto with constant stirring until a clear liquid is obtained which, upon cooling, forms a gel of ointment consistency. The resulting composition contains approximately 10.4% hydroxyethyl cellulose, 63% triethylene glycol, 5.5% hydrogenated corn oil, 0.1% sodium lauryl sulfate, and 21% water.

As examples of iodine ointments in accordance with the present invention, the following are given:

Example 15

To 100 parts of the cooled ointment base of Example 5, free from oleaginous material, 2 parts of powdered iodine and 2.4 parts of powdered sodium iodide were added and thoroughly admixed with slow agitation. A smooth spreading stable ointment resulted in which the iodine and sodium iodide appeared to be in solution in the ointment base.

Example 16

To 100 parts of the cooled composition of Example 13, which was the same as that of Example 5 except that it also contained mineral oil and a dispersing agent, 2 parts of powdered iodine and 2.4 parts of sodium iodide were added in the same manner as in Example 15 to produce a smooth spreading stable iodine ointment.

Example 17

To 100 parts of the cooled composition of Example 2, free from oleaginous material, 0.5 part of iodine and 0.6 part of sodium iodide were added in the same manner as in Example 15 to produce an ointment having a lesser iodine concentration than in Examples 15 and 16.

Example 18

To 100 parts of the cooled composition of Example 10, 1 part iodine and 1.2 parts sodium iodide were added in the same manner as in Example 15 to produce an iodine ointment of intermediate iodine concentration.

Example 19

To 100 parts of the cooled composition of Example 12, 4 parts of iodine and 4 parts of potassium iodide are added in the same manner as in Example 15.

Example 20

To 100 parts of the cooled composition of Example 14, 3 parts of iodine and 3.6 parts of sodium iodide the added in the same manner as in Example 15.

Example 21

To 100 parts of the cooled ointment base of Example 5, free from oleaginous material, 1 part of powdered iodine was added and thoroughly admixed with slow agitation.

From the above given Examples 15 to 21, it should be apparent that iodine alone or iodine and sodium iodide or similar iodine salt can be added to any of the ointment bases above described in substantially any proportions up to approximately 10% iodine content to produce effective iodine ointments.

To indicate the stability of the ointments of the present invention as compared with iodine in other types of ointment bases, four ointments were prepared. Ointment A was made by incorporating 2 parts iodine and 2.4 parts sodium iodide into 100 parts of the composition of Example 5 and containing 10.4 parts hydroxyethyl cellulose, 63 parts triethylene glycol and 21 parts water. Ointment B was made by incorporating 2 parts iodine and 2.4 parts sodium iodide into 100 parts of the composition of Example 13 which was the same as that of Example 5 except that it also contained 5.2 parts mineral oil as specified in the U. S. Pharmacopeia and 0.4 part of oil-free corn oil phosphatides as a dispersing agent. Ointment C was U. S. P. iodine ointment which is 80 parts yellow ointment as specified in the U. S. Pharmacopeia, 12 parts glycerine, 4 parts iodine and 4 parts potassium iodide. Ointment D was made up by incorporating 2 parts iodine and 2.4 parts sodium iodide into 100 parts of semi-solid polyethylene glycol having an average molecular weight of 1500 and sold commercially as "Carbowax 1500."

Volatility tests were made by first analyzing the various ointments to determine the free iodine concentration, then simultaneously exposing the ointments in semi-micro porcelain crucibles of about 1.3 cc. capacity to the atmosphere at different temperatures for varying lengths of time, and then again determining the iodine concentration. Iodine concentration was determined from the weight of the material and by titration with standard thiosulfate.

The result for 16 days' exposure at room temperature of approximately 20° C. and for 6 days at 55° C. are reported in the following table:

Table I

| | Initial Iodine Concentration | 16 Days' Exposure at 20° C. | | 6 Days' Exposure at 55° C. | |
|---|---|---|---|---|---|
| | | Iodine Concentration | Per Cent Change in Concentration | Iodine Concentration | Per Cent Change in Concentration |
| A | 1.95 | 2.29 | +17.6 | 2.13 | +9.34 |
| B | 1.87 | 1.92 | +2.31 | 1.95 | +4.18 |
| C | 3.88 | 3.78 | −2.70 | 1.93 | −50.2 |
| D | 1.94 | 1.85 | −4.99 | 1.89 | −2.37 |

At room temperature, all of the ointments retained their semi-solid consistency and the change in iodine concentration was not excessive. The iodine concentration in ointments A and B in accordance with the present invention increased, indicating that the constituents of these ointments other than iodine evaporated at a slightly greater rate than the iodine and tests at intermediate times indicated the iodine concentration had substantially stabilized at 16 days.

On the other hand, substantially the only material which volatilized from ointments C and D was iodine and the iodine concentration was continuing to decrease.

At 55° C. ointments A and B retained their semi-solid consistency and had substantially stabilized in iodine concentration. On the other hand, both ointments C and D melted and became liquids at the higher temperature and ointment C lost half of its iodine in 6 days.

Penetration tests involving diffusion through agar-agar jelly were also run to compare the effectiveness of the iodine ointments by the methods described in the Canadian Medical Association Journal, vol. 48, page 121 (1943) and the Journal of the American Pharmaceutical Association, vol. XXV, pages 129–140 (1946). To carry out such tests, a 4% agar-agar solution in water, with starch dissolved therein as an indicator, was poured into test tubes until the tubes were filled to approximately one inch from the top and the solution allowed to set at room temperature. The test ointment was then put into the space above the jelly in contact with the jelly, the test tubes being left unstoppered. Penetration of iodine released from the ointment was measured by the depth of the blue color in the agar produced by reaction of iodine with starch. Comparative tests were attempted with the four ointments A, B, C and D described above but ointment D, made with semi-solid polyethylene glycols, rapidly absorbed water from the agar jelly and liquefied. This liquid in contact with the agar showed very rapid penetration of iodine into the agar jelly but did not remain in ointment form for sufficient time for comparison with the other ointments. This absorption of water and liquefaction renders such an ointment unsuitable for many purposes. The penetration for various lengths of time for ointments A, B and C are shown in the following table:

Table II

| Time | Depth of Penetration | | |
|---|---|---|---|
| | Ointment A | Ointment B | Ointment C |
| | Mm. | Mm. | Mm. |
| 8 hours | 9 | 9 | 5 |
| 1 day | 15 | 15 | 7 |
| 2 days | 23 | 20 | 8 |
| 3 days | 27 | 25 | 8 |
| 5 days | 35 | 31 | 8 |
| 9 days | 44 | 41 | 9 |
| 17 days | 60 | 56 | 10 |
| 33 days | 86 | 80 | 10 |

The increased penetration of ointments A and B of the present invention over that of U. S. P. ointment C is evidence of the efficiency of release of iodine by the ointment and of its penetration or absorption into tissues. Tests of penetration into agar jelly in which no starch was employed were also run. The penetration was somewhat greater, although the relative penetrations were about the same. For example, in 33 days the iodine of ointments A and B penetrated 112 mm. while the penetration for ointment C was 10 mm.

To show the antiseptic activity of iodine with sodium iodide in the ointment base of the present invention, examples of bases with varying iodine concentration were compared with that of water solutions having the same iodine concentration. In order to retain iodine in solution in water, sodium iodide is necessary, and in both the ointment and in the water solution such sodium iodide was present in a ratio of 1.2 parts sodium iodide to 1 part iodine. In obtaining the data for the following table the F. D. A. Agar Cup Plate Method (U. S. Department of Agriculture Circular 198) of determining the depth of penetration against *S. aureus* was employed.

Table III

| Iodine Concentration | Depth of Penetration | |
|---|---|---|
| | Ointment Base of Example 13 | Water Solution |
| | Mm. | Mm. |
| 0.5% | 10.0 | 5.0 |
| 0.75% | 17.0 | 6.0 |
| 1.00% | 23.0 | 10.0 |

The increased depth of penetration as compared to water solutions indicates the effectiveness of the iodine ointments of the present invention, even at the low iodine concentrations employed. Such low concentrations are desirable in many cases to decrease the possibility of irritation by the higher concentrations found necessary in prior ointments.

This application is a continuation-in-part of my copending application Serial No. 749,339, filed May 20, 1947, which is in turn a continuation-in-part of application Serial No. 620,408, filed October 4, 1945, now abandoned which is in turn a continuation-in-part of my application Serial No. 575,736, filed February 1, 1945, now abandoned.

While I have disclosed the preferred embodiments of my invention, it is understood that the details thereof may be varied within the scope of the following claims.

I claim:

1. As a composition of matter, an ointment base in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth non-granular gel, the total polyhydroxy alcohol content of said ointment base other than said alkylated cellulose being liquid.

2. As a composition of matter, an ointment base in the form of a smooth, semi-solid gel of ointment consistency, said gel comprising a mixture of liquid glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment base being liquid.

3. As a composition of matter, an ointment base in the form of a smooth, semi-solid gel of ointment consistency, said gel comprising a mixture of liquid glycol, a gelling agent for said glycol and water, the amount of said glycol in said mixture being between approximately 50% and 90% by weight, said gelling agent being predominantly water-dispersible hydroxyethyl cellulose, the amount of said hydroxyethyl cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment base being liquid.

4. As a composition of matter, an ointment base in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment base being liquid.

5. As a composition of mattter, an ointment base in the form of a smooth, semi-solid gel of ointment consistency, said gel comprising a mixture of triethylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol an water, the amount of water in said mixture being between approximately 1% and 30% and being sufficient to provide a smooth non-granular gel, the total glycol content of said ointment base being liquid.

6. As a composition of matter, an ointment base in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible hydroxyethyl cellulose, the amount of said hydroxyethyl cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment base being liquid.

7. As a composition of matter, an ointment base in the form of a smooth, semi-solid gel of ointment consistency, said gel comprising a mixture of propylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment base being liquid.

8. As a composition of matter, an ointment base in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth, non-granular gel, the total polyhydroxy alcohol content of said ointment base other than said alkylated cellulose being liquid, said ointment base also containing a minor proportion of oleaginous material and a small amount of dspersing agent for said oleaginous material.

9. As a composition of matter, an ointment base in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth non-granular gel, the total polyhydroxy alcohol content of said ointment base other than said alkylated cellulose being liquid, said ointment base also containing oleaginous material and a dispersing agent for said oleaginous material, the amount of said oleaginous material being between approximately 3% and 20% of said ointment base and the amount of said dispersing agent being between approximately .0005% and 2% of said ointment base.

10. As a composition of matter, an ointment base in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth, non-granular gel, the total glycol content of said ointment base being liquid, said ointment base also containing oleaginous material and a dispersing agent for said oleaginous material, the amount of said oleaginous material being between approximately 3% and 20% of said ointment base and the amount of said dispersing agent being between approximately .0005% and 2% of said ointment base.

11. As a composition of matter, an ointment base in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible hydroxyethyl cellulose, the amount of said hydroxyethyl cellulose in said mixture being between approximately .3% and 15% and being sufficient to produce a gel of ointment consistency with said glycol and water, the amount of water in said mixture being between approximately 1% and 30% and being sufficient to provide a smooth, non-granular gel, the total glycol content of said ointment base being liquid, said ointment base also containing oleaginous material and a dispersing agent for said oleaginous material, the amount of said oleaginous material being between approximately 3% and 20% of said ointment base and the amount of said dispersing agent being between approximately .0005% and 2% of said ointment base.

12. As a composition of matter, an ointment base in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth non-granular gel, the total polyhydroxy alcohol content of said ointment base other than said alkylated cellulose being liquid, said ointment base also containing mineral oil and a dispersing agent for said mineral oil, the amount of said mineral oil being between approximately 3% and 20% of said ointment base and the amount of said dispersing agent being between approximately .0005% and 2% of said ointment base.

13. As a composition of matter, an ointment base in the form of a smooth, semi-solid gel of ointment consistency, said gel comprising a mixture of triethylene glycol, a gelling agent for said glycol and water, the amount of said glycol in said mixture being approximately 66.7% by weight, said gelling agent being predominantly water-dispersible hydroxyethyl cellulose, the amount of hydroxyethyl cellulose in said mixture being approximately 11% and being sufficient to produce a gel of ointment consistency with said glycol and water, the amount of water in said mixture being approximately 22.3% and being sufficient to provide a smooth, non-granular gel, the total glycol content of said ointment base being liquid, said ointment base also containing mineral oil and oil-free corn oil phosphatides as a dispersing agent for said mineral oil, the amount of mineral oil being approximately 5.2% of said ointment base and the amount of said dispersing agent being approximately 0.4% of said ointment base.

14. The method of making an ointment base, which comprises, substantially completely dispersing water dispersible alkylated cellulose in an amount of water substantially greater than the amount of alkylated cellulose, admixing liquid aliphatic polyhydroxy alcohol with the resulting dispersion in an amount substantially greater than the amount of alkylated cellulose, heating the resulting mixture to a temperature between approximately 70° and 160° C. to evaporate a portion of said water and disperse said alkylated cellulose in the mixture of water and alcohol, the amount of remaining water being substantially less than the amount of polyhydroxy alcohol, and cooling the resulting mixture to form a gel structure.

15. The method of making an ointment base, which comprises, substantially completely dispersing water dispersible alkylated cellulose in an amount of water substantially greater than the amount of alkylated cellulose, admixing liquid aliphatic polyhydroxy alcohol with the resulting dispersion in an amount substantially greater than the amount of alkylated cellulose and heating the mixture thus produced to a temperature between approximately 70° and 160° C. to evaporate a portion of said water to disperse alkylated cellulose in the mixture of water and alcohol, the amount of remaining water being substantially less than the amount of polyhydroxy alcohol, forming another mixture of a mineral oil and an oil-soluble dispersing agent for said oil, adding one of said mixtures to the other while maintaining the temperature of the resulting mixture sufficiently high to cause said resulting mixture to remain in liquid condition, and thereafter cooling said resulting mixture to form an ointment base having a gel structure.

16. The method of making an ointment base, which comprises, substantially completely dispersing water dispersible hydroxyethyl cellulose in an amount of water substantially greater than the amount of hydroxyethyl cellulose, admixing a major portion of liquid polyoxyethylene glycol with the resulting dispersion and heating the mixture thus produced to evaporate a portion of said water to disperse the hydroxyethyl cellulose in the mixture of water and alcohol as a first mixture, forming a second mixture of a mineral oil and an oil-soluble dispersing agent for said oil, adding a minor proportion of said second mixture to a major proportion of said first mixture while maintaining the temperature of the resulting mixture between approximately 70° and 160° C. and sufficiently high to cause said resulting mixture to remain in liquid condition, and thereafter cooling said resulting mixture to form an ointment base having a gel structure.

17. The method of making an ointment base, which comprises, substantially completely dispersing water dispersible hydroxyethyl cellulose in an amount of water substantially greater than the amount of hydroxyethyl cellulose, admixing a major proportion of liquid polyoxyethylene glycol with the resulting dispersion and heating the mixture thus produced to evaporate a portion of said water to disperse the hydroxyethyl cellulose in the mixture of water and alcohol as a first mixture, forming a second mixture of a mineral oil and an oil-soluble dispersing agent for said oil, adding a minor proportion of said second mixture to a major proportion of said first mixture while maintaining the temperature of the resulting mixture between approximately 70° and 160° C. and sufficiently high to cause said resulting mixture to remain in liquid condition, and thereafter cooling said resulting mixture to form an ointment base having a gel structure, the proportions of the various materials employed being such as to produce a resultant mixture containing between approximately 50% and 90% polyoxyethylene glycol, 1 and 30% water, 0.3 and 15% hydroxyethyl cellulose, 3% and 20% oil, and 0.0005 and 2% dispersing agent.

18. As a composition of matter, an ointment in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment being liquid, said ointment also containing between approximately ½ and 10% of iodine based on the total weight of said mixture.

19. As a composition of matter, an ointment in the form of a smooth, semi-solid gel of ointment consistency, said gel comprising a mixture of liquid polyoxyethylene glycol, a gelling agent for said glycol and water, the amount of said glycol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment being liquid, said ointment also containing oleaginous material, a dispersing agent for said oleaginous material, and small amounts of iodine and an alkali metal salt of iodine, the amount of said oleaginous material being between approximately 3% and 20% of said mixture and the amount of said dispersing agent being between approximately .0005% and 2% of said mixture, said mixture, said oleaginous material and said dispersing agent constituting an ointment base, the amount of said iodine being between approximately ½ and 10% based on the total weight of said ointment base and the amount of said alkali metal salt of iodine being between approximately ½ and 15% based on the total weight of said ointment base.

20. As a composition of matter, an ointment in the form of a smooth, semi-solid gel of ointment conssitency, said gel comprising a mixture of liquid polyoxyethylene glycol, a gelling agent for said glycol and water, the amount of said glycol in said mixture being between approximately 50% and 90% by weight, said gelling agent being predominantly water-dispersible hydroxyethyl cellulose, the amount of said hydroxyethyl cellulose in said mixture being between approximately .3% and 15% and being sufficient to produce a gel of ointment consistency with said glycol and water, the amount of water in said mixture being between approximately 1% and 30% and being sufficient to provide a smooth non-granular gel, the total glycol content of said ointment being liquid, said ointment also containing mineral oil, oil-free corn oil phosphatides as a dispersing agent for said mineral oil and small amounts of iodine and an alkali metal salt of iodine, the amount of mineral oil being between approximately 3% and 20% of said mixture and the amount of said dispersing agent being between approximately .0005% and 2% of said mixture, said mixture, said mineral oil and said dispersing agent constituting an ointment base, the amount of said iodine being between approximately ½ and 10% based on the total weight of said ointment base and the amount of said alkali metal salt of iodine being between ½ and 15% based on the total weight of said ointment base.

21. As a composition of matter, an ointment in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth, non-granular gel, the total polyhydroxy alcohol content of said ointment other than said alkylated cellulose being liquid, said ointment containing a small amount of iodine.

22. As a composition of matter, an ointment base in the form of a smooth, semi-solid gel of ointment consistency, said gel comprising a mixture of liquid aliphatic polyhydroxy alcohol, a gelling agent for said polyhydroxy alcohol and water, the amount of said polyhydroxy alcohol in said mixture being between approximately 50% and 90% by weight, said gelling agent being predominantly water-dispersible alkylated cellulose, the amount of said alkylated cellulose in said mixture being between approximately .3% and 15% and being sufficient to produce a gel of ointment consistency with said alcohol and water, the amount of water in said mixture being between approximately 1% and 30% and being sufficient to provide a smooth, non-granular gel, the total polyhydroxy alcohol content of said ointment base other than said alkylated cellulose being liquid, said ointment base also containing oleaginous material, a dispersing agent for said oleaginous material, and small amounts of iodine and an alkali metal salt of iodine, the amount of said oleaginous material being between approximately 3% and 20% of said ointment base and the amount of said dispersing agent being between approximately .0005% and 2% of said ointment base.

23. As a composition of matter, an ointment base in the form of a smooth, semi-solid gel of ointment consistency, said gel comprising a mixture of triethylene glycol, a gelling agent for said glycol and water, the amount of said glycol in said mixture being approximately 66.7% by weight, said gelling agent being predominantly water-dispersible hydroxyethyl cellulose, the amount of said hydroxyethyl cellulose in said mixture being approximately 11% and being sufficient to produce a gel of ointment consistency with said glycol and water, the amount of water in said mixture being approximately 22.3% and being sufficient to provide a smooth, non-granular gel, the total glycol content of said ointment base being liquid, said ointment base also containing mineral oil, oil-free corn oil phosphatides as a dispersing agent for said mineral oil and small amounts of iodine and an alkali metal salt of iodine, the amount of mineral oil being approximately 5.2% of said ointment base, the amount of said dispersing agent being approximately 0.4% of said ointment base, the amount of said iodine being approximately 2% of said ointment base and the amount of said salt of iodine being approximately 2.4% of said ointment base.

ABRAHAM TAUB.

REFERENCES CITED

The following references are of record in the file of this patent:

UNITED STATES PATENTS

| Number | Name | Date |
|---|---|---|
| 1,383,495 | Shepherd | July 5, 1921 |
| 1,719,523 | Stephens | July 2, 1929 |
| 1,844,754 | Geller | Feb. 9, 1932 |
| 1,903,614 | Karns et al. | Apr. 11, 1933 |

FOREIGN PATENTS

| Number | Country | Date |
|---|---|---|
| 105,579 | Australia | Nov. 3, 1938 |
| 705,450 | Germany | Apr. 29, 1941 |

OTHER REFERENCES

Dumez: J. A. P. A., July 1939, pages 416–419, vol. 27, No. 7, 167–82D.

Janistyn: Reichstoffe-Industrie, 1943, No. 2, pages 20–21, 167–63G.

Muhlemann: Schweizerische, Apotheker-Zeitung, vol. 80 (1942), pages 283–286, 167–63G.

Dultz: Deutsche Apotheker-Zeitung, vol. 55, Aug. 28, 1940, pages 524–526.

Atlas—Spans and Tweens Pamphlet, published by Atlas Powder Co., Industrial Chemicals Department, Wilmington, Delaware, Nov. 24, 1942. Inside front cover and page 8. (Copy in 167–85W.)

Ewe: J. A. P. A., Jan. 1920, pages 49–51. (Copy in P. O. S. L.) 167–70.

Meleny et al.: Report to Committee on Medical Research of the Office of Scientific Research and Development Contract OEMcmr 334. Subject "Study of vehicles and adjuvants for the sulfonamides for bacteriostasis in war wounds," Report No. 4 Feb. 4, 1944, page 1 and Report No. 5, April 1, 1944, 3 pages.

J. A. P. A., Scientific Edition, April 1942, page 107. (Copy in P. O. S. L.)

Manufacturing Chemist and Manufacturing Perfumer, June 1942, vol. XIII, No. 6. Page 134.